US010329469B2

(12) United States Patent
Peterson et al.

(10) Patent No.: US 10,329,469 B2
(45) Date of Patent: Jun. 25, 2019

(54) INCREASING THE HEAT FLOW OF FLEXIBLE CELLULAR FOAM THROUGH THE INCORPORATION OF HIGHLY THERMALLY CONDUCTIVE SOLIDS

(71) Applicant: PETERSON CHEMICAL TECHNOLOGY LLC, West Lake Hills, TX (US)

(72) Inventors: Bruce W. Peterson, West Lake Hills, TX (US); Gualtiero G. Giori, Fort Myers, FL (US); Mark L. Crawford, Rudy, AR (US)

(73) Assignee: Peterson Chemical Technology, LLC., West Lake Hills, TX (US)

( * ) Notice: Subject to any disclaimer, the term of this patent is extended or adjusted under 35 U.S.C. 154(b) by 0 days.

(21) Appl. No.: 15/581,978

(22) Filed: Apr. 28, 2017

(65) Prior Publication Data
US 2018/0022978 A1 Jan. 25, 2018

Related U.S. Application Data

(62) Division of application No. 14/135,221, filed on Dec. 19, 2013, now abandoned.

(60) Provisional application No. 61/746,369, filed on Dec. 27, 2012.

(51) Int. Cl.
*C09K 5/14* (2006.01)
*A47G 9/10* (2006.01)
*A47C 27/15* (2006.01)
*A47C 21/04* (2006.01)

(52) U.S. Cl.
CPC .............. *C09K 5/14* (2013.01); *A47C 21/046* (2013.01); *A47C 27/15* (2013.01); *A47G 9/10* (2013.01); *A47G 2009/1018* (2013.01)

(58) Field of Classification Search
CPC ........ A47C 21/046; A47C 27/15; A47G 9/10; A47G 2009/1018; C09K 5/14; C08J 9/0066; C08J 2205/06; C08J 2375/04
See application file for complete search history.

(56) References Cited

U.S. PATENT DOCUMENTS

| 2,343,581 | A | 3/1944 | Reeves |
| 3,090,094 | A | 5/1963 | Schwartzwalder et al. |
| 3,097,930 | A | 7/1963 | Holland |
| 3,266,064 | A | 8/1966 | Figman |
| 3,681,797 | A | 8/1972 | Messner |
| 4,024,212 | A | 5/1977 | Dore et al. |
| 4,452,920 | A | 6/1984 | Joubert |
| 4,572,188 | A | 2/1986 | Augustine et al. |
| 4,574,411 | A | 3/1986 | Yagi |
| 4,931,479 | A | 6/1990 | Morgan et al. |
| 5,232,970 | A | 8/1993 | Solc et al. |
| 5,366,801 | A | 11/1994 | Bryant et al. |
| 5,397,808 | A | 3/1995 | Doerg et al. |
| 5,441,476 | A | 8/1995 | Kitado et al. |
| 5,449,654 | A | 9/1995 | Prin et al. |
| 5,555,579 | A | 9/1996 | Wu |
| 5,568,659 | A | 10/1996 | Fogel |
| 6,085,369 | A | 7/2000 | Feher |
| 6,103,152 | A | 8/2000 | Gehlsen et al. |
| 6,121,336 | A | 9/2000 | Okoroafor et al. |
| 6,425,527 | B1 | 7/2002 | Smole |
| 6,497,720 | B1 | 12/2002 | Augustine et al. |
| 6,602,925 | B1 | 8/2003 | Van Den Bosch et al. |
| 6,687,937 | B2 | 2/2004 | Harker |
| 6,698,510 | B2 | 3/2004 | Serra et al. |
| 6,699,266 | B2 | 3/2004 | Lachenbruch et al. |
| 6,887,809 | B1 | 5/2005 | Adler |
| 7,077,990 | B2 | 7/2006 | Miller |
| 7,191,478 | B2 | 3/2007 | Schmidt et al. |
| 7,520,012 | B2 | 4/2009 | Robin |
| 7,727,267 | B2 | 6/2010 | Lachenbruch et al. |
| 7,744,991 | B2 | 6/2010 | Fischer et al. |
| 8,993,140 | B2 | 1/2015 | Peterson |
| 2004/0241417 | A1 | 12/2004 | Fischer et al. |
| 2004/0247852 | A1* | 12/2004 | Kume ..................... B24B 37/24 428/304.4 |
| 2005/0070620 | A1 | 3/2005 | Herrington |
| 2006/0110998 | A1 | 5/2006 | Takenishi et al. |
| 2008/0142494 | A1 | 6/2008 | Blake et al. |
| 2011/0155945 | A1 | 6/2011 | Soong |
| 2011/0155946 | A1 | 6/2011 | Simpson |
| 2012/0048528 | A1 | 3/2012 | Bergin |

OTHER PUBLICATIONS

International Search Report and Written Opinion in PCT/US2013/076888, dated Apr. 14, 2014.

* cited by examiner

*Primary Examiner* — John M Cooney
(74) *Attorney, Agent, or Firm* — Mossman, Kumar & Tyler PC

(57) ABSTRACT

Methods and combinations of mattress support surfaces comprising one or more flexible polyurethane foam layers containing highly thermally-conductive solids, such as diamond or silicon carbide, and said layer combination is capable of transferring heat from a warm surface, such as a person sleeping on a bed, to a cooler region at a faster rate throughout the mattress than the thermal dissipation rate obtained from flexible polyurethane foam without highly thermally-conductive solids.

14 Claims, 7 Drawing Sheets

INCREASING THE HEAT FLOW OF FLEXIBLE CELLULAR FOAM THROUGH THE INCORPORATION OF HIGHLY THERMALLY CONDUCTIVE SOLIDS

CROSS-REFERENCE TO RELATED APPLICATION

This application is a divisional application from U.S. Ser. No. 14/135,221 filed Dec. 19, 2013, now abandoned, which claims the benefit of U.S. Provisional Patent Application No. 61/746,369 filed Dec. 27, 2012, both of which are incorporated herein by reference in their entirety.

TECHNICAL FIELD

This invention relates to incorporating highly thermally-conductive solids in a polyurethane foam polymer matrix, wherein said combination is used in bedding and seating articles, and more particularly this invention relates to articles that transfer heat from a warm surface, such as a person sleeping on a bed, to a cooler region at a faster rate than the heat dissipation rate obtained from flexible polyurethane foam without highly thermally conductive solids incorporated therein.

TECHNICAL BACKGROUND

Typically, high density flexible polyurethane foams have low thermal conductivities in the range of 0.02-0.04 W/(m-°K) in an uncompressed state. High density polyurethane foams have a tendency to trap heat and slowly diffuse heat through conduction and convection. In particular, high density memory foam has the tendency to "sleep hotter" than traditional flexible foam, due to reduced open void space within the foam. When a person lies down on a memory foam mattress surface, the foam open void space reduces during compression and reduces the potential for air migration within the foam. As foam compression increases, convective heat transfer decreases and conductive heat transfer increases.

In previous mattress heat dissipation methods, bedding manufacturers have modified flexible polyurethane foam layers with various surface modifications and through-body modifications such as channeling, convoluting, and punching holes in a mattress layer in order to allow more air to pass through the foam; thereby, heat is able to dissipate faster from the mattress due to more void space. Prior methods also include forced heat dissipation methods, such as using a ventilation fan to induce cooling or a heat pump to remove heat from a bed.

Prior patents do not teach adding highly thermally conductive solids to flexible polyurethane foam to increase the foam thermal conductivity and using said increased thermally conductive flexible polyurethane foam as one or more layers in a mattress or seating article. Rigid silicon carbide foam (ceramic foam) has previously been utilized for high temperature applications, especially for the aerospace industry, heat exchangers, and compact electronics cooling.

It would be useful and desirable to develop a flexible, open-celled polyurethane foam containing highly thermally conductive solids to achieve improved heat dissipation which may be used in mattresses, pillows, topper pads or seat cushions.

SUMMARY

There is provided, in one non-limiting form, methods of forming flexible cellular foam with highly thermally conductive solids (HTCS) comprised of a flexible polyurethane foam and/or polyester foam, which may be open or partially open-celled in nature, and a plurality of highly thermally conductive solids, and the foams so made, wherein said combination is used in bedding and seating articles. Other performance modifying additives may optionally be incorporated into the foam. HTCS particles may be added in the range of about 0.1% independently to about 50% by weight based on the final foam net weight after gas loss. HTCS are comprised of, but not limited to, silicon carbide, diamond crystal powder, natural diamond crystal powder, type IIa diamond powder, synthetic diamond, boron nitride, and combinations thereof. HTCS is added to the polyurethane raw materials prior to reaction with an isocyanate resulting in a uniformly-dispersed solid within the polyurethane foam. Optionally, the flexible cellular foam may be synthetic or natural latex foam or melamine foam.

The flexible cellular foam with highly thermally-conductive solids may be cut or molded in many structures such as, but not limited to, planar layers, convoluted layers, surface modified layers, 3D surface texturing, molded pillows, smooth molded surfaces, molded surfaces with regular or irregular patterns, or modified in any way as to generate a desired physical structure such as but not limited to hole punching, channeling, reticulation or other method known to the art of foaming for modifying the structure of foam.

There is also provided, in a non-restrictive embodiment, combinations of suitable layering substrates including, but not limiting to, flexible polyurethane foam, latex foam, flexible melamine foam, and other substrates (such as fibers in woven or non-woven form) with at least one layer of flexible cellular foam with highly thermally-conductive solids. Articles that may be manufactured from these combinations include, but are not necessarily limited to, mattresses, mattress toppers, pillows, bedding products, pet beds, quilted mattress toppers, pillow or mattress inserts, contoured support foam, or other cushioning products.

Figure 1:
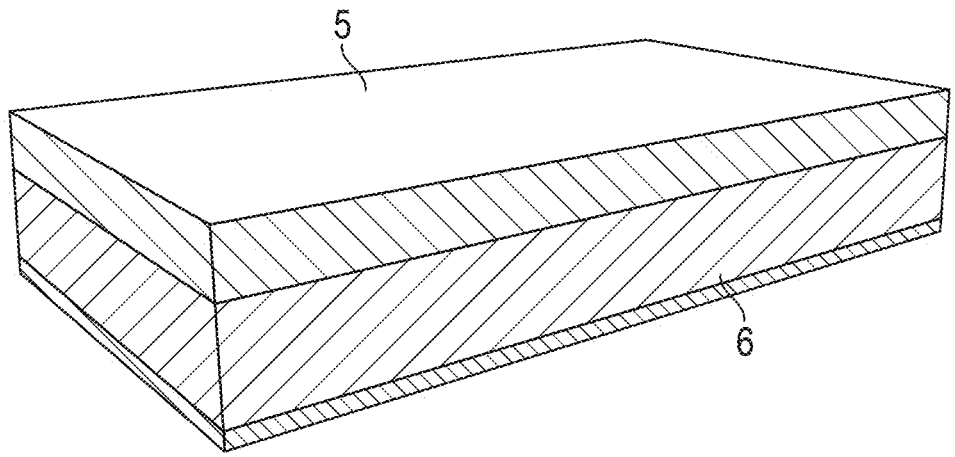
FIG. 1 is a schematic view of a support surface made with a top comfort layer typically made of high density foam, such as memory foam.

It will be appreciated that FIGS. 1-2, 3A, 3B, and 4-17 are schematic and that the various elements are not necessarily to scale or proportion, and that many details have been removed or simplified for clarity, and thus the methods and compositions are not necessarily limited to the embodiments depicted in the Figures.

Before the methods and compositions are explained in detail, it is to be understood that these methods and compositions are not limited in applications to the details of construction and the arrangements of the components set forth in the following description or illustrated in drawings. Also, it is understood that the phraseology and terminology used herein are for the purpose of description and should not be regarded as limiting.

DETAILED DESCRIPTION

The methods taught herein of using a highly thermally-conductive solid (HTCS) in flexible cellular foam are useful in improving heat dissipation in mattresses, pillows, topperpads or seat cushions.

Flexible cellular foams may include, but are not limited to, open-celled polyurethane foam, partially open-celled polyurethane foam, open-celled polyester polyurethane foam, partially open-celled polyester polyurethane foam, latex foam, melamine foam, and combinations thereof.

Highly thermally-conductive solids (HTCS) are added to a flexible polyurethane foam polymer matrix and said combination is used in bedding and seating articles. Heat in a warm region, such as a person sleeping on a bed, dissipates to a cooler region through conduction and convection. Incorporation of HTCS in flexible polyurethane foam increases the thermal conductivity of the composite and allows heat to transfer at a faster rate through the composite from a warm region to a cooler region.

HTCS is comprised of, but not limited to, silicon carbide, diamond crystal powder, natural diamond crystal powder, type IIa diamond powder, synthetic diamond, boron nitride, carbonado, and combinations thereof. HTCS is added in the range of about 0.1 wt % independently to about 50% by weight based on the final foam net weight after gas loss (solids content). In one non-limiting embodiment, the HTCS is added in the range of about 1 wt % independently to 35% by weight based on the final foam net weight after gas loss; and alternatively, the HTCS is added in the range of about 5 wt % independently to about 25% by weight based on the final foam net weight after gas loss. The word "independently" as used herein with respect to a parameter range means that any lower threshold may be used with any upper threshold to give a suitable alternative range for that parameter.

The HTCS may suitably be a powder having an average particle size in the range of about 1 independently to about 3000 microns, alternatively from about 10 independently to about 1000 microns, so that the HTCS is contained or encapsulated within the polyurethane foam strut matrix or held on the surfaces of the polyurethane foam struts. Nano-sized particles, such as crystals and ribbons, may also be used. As used herein, "nano-sized" is defined to mean having an average particle size between about 50 to about 1000 nanometers. As defined herein, "average particle size" may be defined as any one of median size or geometric mean size or average size, based on volume.

One suitable HTCS material is diamond particles or crystals from either natural or synthetic origin. The diamond particles or crystals are contained or encapsulated within the polyurethane foam strut matrix or held on the surfaces of the polyurethane foam struts. Single crystal natural diamond or Type IIa diamond has a high thermal conductivity of up to about 2000 W/(m-° K). Additional types of HTCS particles may be added into the foam blend to complement the diamond particles.

Another suitable HTCS material is silicon carbide particles. Silicon carbide has high thermal conductivity values around 280-400 W/(m-° K), depending on the crystalline shape of silicon carbide. Silicon carbide particles may be used by itself or in combination with other HTCS powders. Silicon carbide may suitably be a powder having an average particle size in the range of about 1 independently to about 3000 microns, so that the silicon carbide particles are contained or encapsulated within the polyurethane foam strut matrix or held on the surfaces of the polyurethane foam struts.

The flexible cellular foam with highly thermally-conductive solids may also contain useful amounts of conventionally employed additives ("property-enhancing additives") such as plasticized triblock copolymer gels, stabilizers, antioxidants, antistatic agents, antimicrobial agents, ultraviolet stabilizers, phase change materials, surface tension modifiers such as silicone surfactants, emulsifying agents, and/or other surfactants, solid flame retardants, liquid flame retardants, grafting polyols, compatible hydroxyl-containing chemicals which are completely saturated or unsaturated in one or more sites, solid or liquid fillers, anti-blocking agents, colorants such as inorganic pigments, carbon black, organic colorants or dyes, reactive organic colorants or dyes, heat-responsive colorants, heat-responsive pigments, heat-responsive dyes, pH-responsive colorants, pH-responsive pigments, pH-responsive dyes, fragrances, viscosity-modifiers such as fumed silica and clays, thermally conductive-enhancing additives such as aluminum and graphite, and combinations thereof, and other polymers in minor amounts and the like to an extent not affecting or substantially decreasing the desired properties of the flexible cellular foam with highly thermally-conductive solids.

It is beyond the scope of this disclosure to describe all of the conceivable combinations and variations of diamond and silicon carbide crystalline properties. A multitude of crystals, metal diamond composites, ceramics, boron-doped crystals, metal-covered glass spheres, or ceramic spheres may alternatively be used as a material offering high degrees of thermal conductivity in this application. These particles, especially crystals, may be added to polyurethane foam to increase thermal conductivity of the polyurethane foam articles.

This invention is not limited to any particular crystalline structure, either of natural or synthetic-based origin. In a non-limiting form, the crystalline structure may be doped with inorganic materials to modify the crystalline properties. For example, a diamond crystalline structure may be modified by boron or nitrogen, which produces a blue or yellow color, respectively, within the crystalline lattice. Alternatively, carbonado, which is also known as "Black Diamond", may be used. Carbonado is a polycrystalline diamond that contains diamond graphite, and amorphous carbon.

Prior to making flexible polyurethane foam, the HTCS may be blended with various liquid raw materials, which typically contain, but are not limited to, polyols, polyether glycols, polyester polyols, copolymer polyols, isocyanates, or any other polyurethane foam reactant, either in liquid, solid, or some combination thereof.

Figure 4:
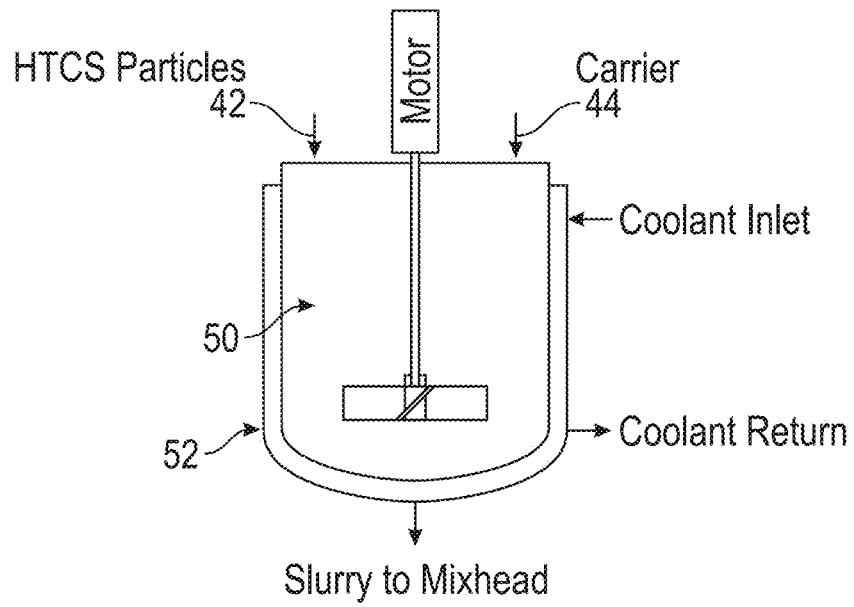
FIG. 4 is an example blending system of polyol and HTCS particles.

One non-limiting embodiment of adding HTCS particles 42 to the compatible carrier 44 is by adding the HTCS particles 42 into a compatible carrier in a mix tank 50, as schematically illustrated in FIG. 4. A typical mix tank 50 may have a heating/cooling jacket 52 for controlling the temperature within the tank. The carrier is added to the mixing tank and then the HTCS particles 42 are mixed into the carrier while agitating. While mixing, the HTCS particles 42 may be added to the tank gradually or all at once. Alternatively, the HTCS particles 42 may be added to the mixing tank first and then the compatible carrier added to the tank while mixing. Another non-limiting method of adding HTCS particles to the compatible carrier is by transferring the HTCS particles into a mix chamber using an auger, where the HTCS particles and compatible carrier are mixed prior to adding other chemicals required to make polyurethane foam. Alternatively, mixing may be performed directly into the main mix head or can be mixed in a separate mix head and the HTCS particles and compatible carrier mixture fed into the main mix head with the other formulation components. Another non-restrictive method may be to use the auger to mix the HTCS particles and compatible carrier together while augering to the main mix head.

In one non-limiting form, HTCS may be added to a polyol liquid. After adequate mixing and dispersion, the polyol/HTCS blend may be mixed with isocyanate along with one or more of the following: water, auxiliary blowing agent, silicone surfactant, gelation catalyst such as stannous octoate or dibutyltin dilaurate, blowing catalyst such as triethylene diamine. The mixture flows on a moving conveyor or into a mold, and flexible polyurethane foam is produced which incorporates, encapsulates, or binds the HTCS particles in the foam matrix.

Alternatively, HTCS particles may be mixed in a minor polyurethane additive stream, such as silicone surfactant, and added directly to the mix-head or manifold. The mixture flows on a moving conveyor or into a mold, and a flexible polyurethane foam is produced which incorporates the HTCS particles.

The flexible cellular foam with highly thermally-conductive solids may be poured in a standard bun form on a conveyor, poured in a mold having planar or non-planar surfaces, textured with 2D and 3D modification, or poured in a mold with rods to make the foam perforated.

In one non-limiting embodiment, one or more flexible cellular foams with highly thermally-conductive solids may be added within or on the surface or in any location within the interior cavity of a mold for making molded products such as, but not limited to, pillows, mattresses, mattress toppers, pet beds, seat cushions, and individual substrate components added to the mold to react, bind, or encapsulate the flexible cellular foam with highly thermally-conductive solids.

It will be appreciated that the method described herein is not limited to these examples, since there are many possible combinations for combining HTCS particles with a compatible carrier before incorporating HTCS particles into final polyurethane foam.

EXAMPLES

A two component system was obtained from Peterson Chemical Technology. The system consisted of a "B" side (PCT-8205B) containing polyols, water, silicone surfactant, gelation catalyst and blowing catalyst, and the "A" side (PCT-8205A) which consisted of an isocyanate compound. Foam sample 1 is the foam control sample that does not contain HTCS particles, and foam sample 2 is a polyurethane foam produced from the two component system with addition of silicon carbide to obtain a final concentration of 17.5% by weight based on the final foam net weight after gas loss.

Table 1 shows the physical properties of foam samples 1 and 2. The densities, IFDs and airflows were measured according to ASTM D3574. The thermal conductivity was measured according to ASTM E1225 test method with a 75% compression on the foam sample. The results show a 15.8% improvement in thermal conductivity by incorporating 17.5 wt % silicon carbide in the polyurethane foam components before reacting into a flexible polyurethane foam. The polyurethane foam can be utilized as one or more layers in a mattress.

TABLE 1

Formulation and Physical Property Testing

| | | Foam Sample | |
|---|---|---|---|
| Component | Units | Comparative 1 | Inventive 2 |
| "B" Side-PCT8205B | parts by weight | 103.25 | 103.25 |
| "A" Side-PCT8205A | parts by weight | 43.21 | 43.21 |
| Silicon Carbide | parts by weight | 0 | 30 |
| Total Parts | parts by weight | 146.46 | 176.46 |
| Gas Loss | parts by weight | 5.12 | 5.12 |
| Net parts | parts by weight | 141.34 | 171.34 |
| HTCS | % by weight based on the final foam net weight after gas loss | Control | 17.51% |
| Physical Properties | | | |
| Density | lb/ft$^3$ (kg/m$^3$) | 3.45 (55.3) | 4.09 (65.5) |
| IFD | lb/50 in$^2$ (N/323 cm$^2$) | 9.1 (40.5) | 7.6 (33.8) |
| Airflow | SCFM | 4.9 | 4.9 |

TABLE 1-continued

Formulation and Physical Property Testing

| Component | Units | Foam Sample | |
|---|---|---|---|
| | | Comparative 1 | Inventive 2 |
| Thermal Conductivity at 75% Compression | W/(m-° K) | 0.0507 | 0.0587 |

TABLE 2

Raw Material Supplier List

| | |
|---|---|
| PCT8205B | "B" side of a flexible polyurethane foam system, supplied by Peterson Chemical Technology, Inc. |
| PCT8205A | "A" side of a flexible polyurethane foam system, supplied by Peterson Chemical Technology, Inc. |
| Silicon Carbide | Silicon carbide powder with an average particle size of 45 microns |

Applications of the Flexible Cellular Foams with Highly Thermally-Conductive Solids The list below shows some, but not all, of the applicable uses of HTCS in polyurethane foams produced by the methods herein.
1. Mattresses, mattress toppers, pillows, and bed-top products;
2. General furnishings and upholstered furniture including pet beds, cushions, armrests, seat-backs, foot-rests, decorative cushioning and functional support.

Flexible cellular foams with highly thermally-conductive solids may be manufactured and combined with substrate foams for use in a variety of bedding applications, including but not necessarily limited to, mattresses, pillows, pillow toppers, mattress toppers, quilted toppers, body support foam, pet beds, outdoor bedding pads, outdoor pillows, or other cushioning materials.

Layering substrates in combination with one or more flexible cellular foams with highly thermally-conductive solids and optional property-enhancing materials described herein may find utility in a very wide variety of applications. Suitable layering substrates include, but are not limited to, flexible polyurethane foam, flexible polyester polyurethane foam, latex foam, flexible melamine foam, and other substrates (such as fibers in woven or non-woven form), and combinations thereof. More specifically, in other non-limiting embodiments, the combination of flexible cellular foam with highly thermally-conductive solids and substrate would be suitable as pillows or pillow components, including, but not necessarily limited to, pillow wraps or shells, pillow cores, pillow toppers, for the production of medical comfort pads, medical mattresses and similar comfort and support products, and residential/consumer mattresses, mattress toppers, pet beds, outdoor bedding pads, outdoor pillows, and similar comfort and support products, typically produced with conventional flexible polyurethane foam or fiber. All of these uses and applications are defined herein as "bedding products" or cushioning products.

In FIG. 1, polyurethane foam 5 acts as a top comfort layer of a mattress, which said comfort layer is made out of, but not limited to, memory foam, latex foam, soft polyurethane foams. The mattress has a core support portion 6, which can also be made of, but not limited to, foam, springs or air core. This is an example of a conventional memory foam mattress.

Figure 2:
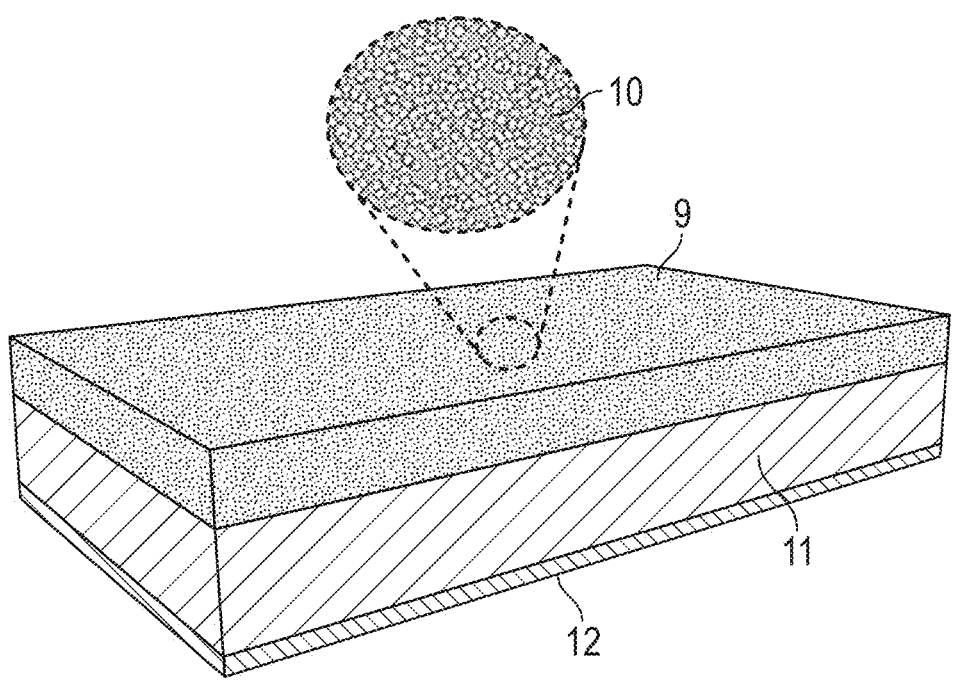
FIG. 2 is a schematic view of a support surface made with a top comfort layer which contains thermally conductive particles embedded in said comfort layers at manufacture.

In FIG. 2, the mattress uses a polyurethane foam composite 9 containing one or more HTCS materials 10 to increase the thermal conductivity of the mattress top layer; shown in more detail in the oval of FIG. 2. A support core 11 and optional firm bottom support layer 12 are used in this non-limiting embodiment.

Figure 3A:
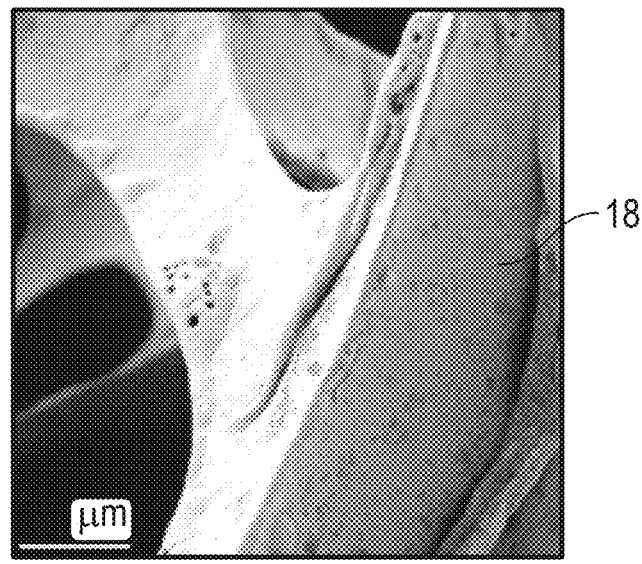
FIG. 3A is a three-dimensional view of a foam cell, and its struts or windows.
Figure 3B:
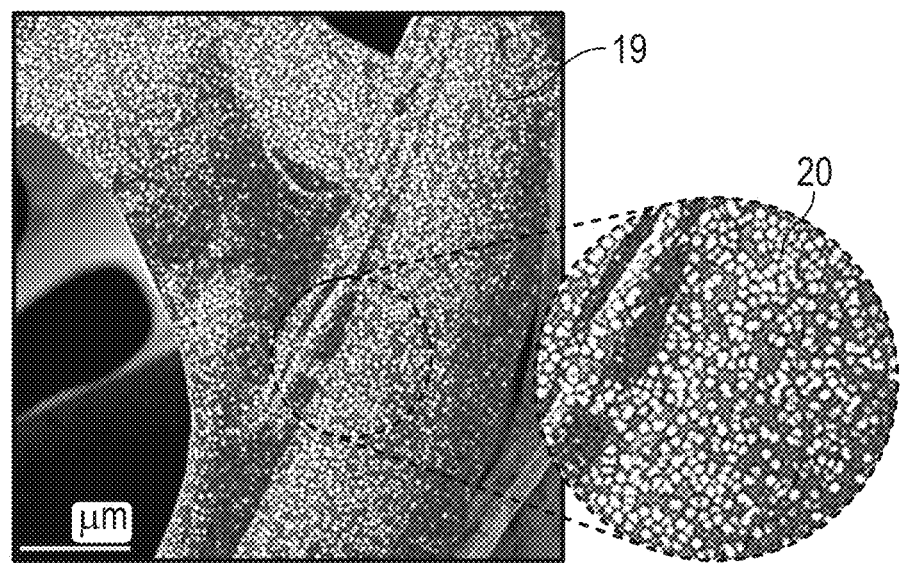
FIG. 3B shows the same strut of FIG. 3A containing added thermally conductive embedded crystals thereon.

FIG. 3A shows a magnified foam cell and the foam cell strut 18; whereas, in FIG. 3B, the same foam strut with HTCS materials 19 is magnified in a close-up 20 of foam strut with HTCS materials 19.

Figure 5:
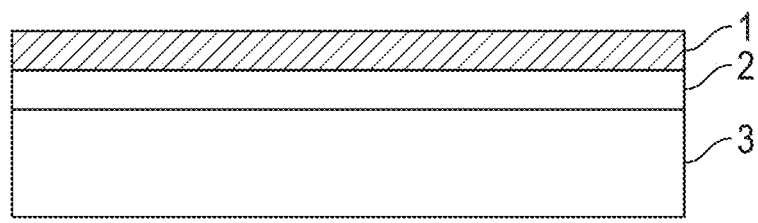
FIG. 5 is an example of construction using a cushion and/or mattress application implementing the flexible cellular foams with highly thermally-conductive solids described herein.

FIG. 5 is an example of construction using a cushion and/or mattress application. The base of the section is a prime foam layer 3. On top of this is a 2 inch (5 cm) standard, open-celled viscoelastic (visco) layer 2. The top layer 1 is a 2 inch (5 cm) layer of flexible cellular foam with highly thermally-conductive solids. It will be appreciated that the dimensions given in the examples and descriptions of the various Figures are merely illustrative and are not intended to be limiting. Throughout the drawings, the same or similar reference numerals will be used for the same or similar structures.

Figure 6:
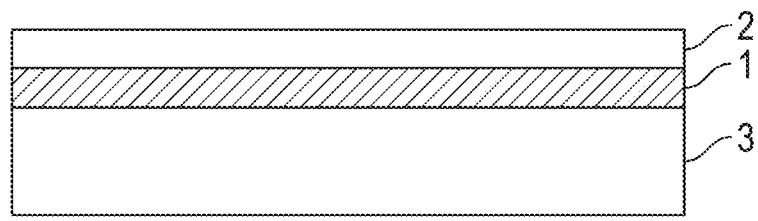
FIG. 6 is an example construction using a cushion and/or mattress application implementing the flexible cellular foams with highly thermally-conductive solids described herein.

FIG. 6 is an example construction using a cushion and/or mattress application. The base of the section is a prime foam layer 3. On top of this is a 2 inch (5 cm) layer of flexible cellular foam with highly thermally-conductive solids 1 followed by a 2 inch (5 cm) layer 2 of standard, open-celled viscoelastic foam.

Figure 7:
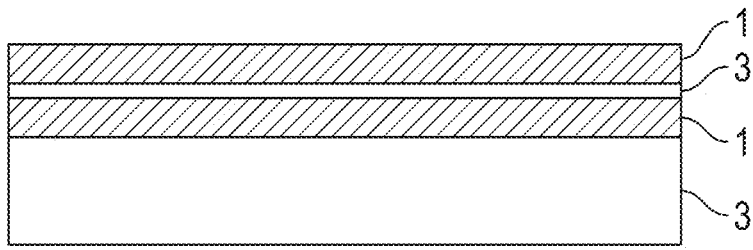
FIG. 7 is an example construction using a cushion and/or mattress application implementing the flexible cellular foams with highly thermally-conductive solids described herein.

FIG. 7 is an example construction using a cushion and/or mattress application. The base of the section is a prime foam layer 3. On top of this is a 2 inch (5 cm) layer of flexible cellular foam with highly thermally-conductive solids 1 followed by a 0.75 inch (1.9 cm) layer 3 of prime foam. The top layer is a second 2 inch (5 cm) layer of flexible cellular foam with highly thermally-conductive solids 1.

Figure 8:
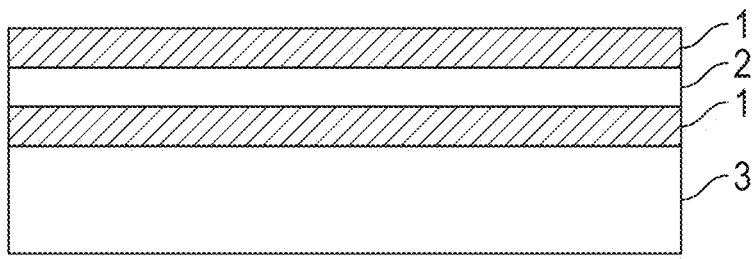
FIG. 8 is an example construction using a cushion and/or mattress application implementing the flexible cellular foams with highly thermally-conductive solids described herein.

FIG. 8 is an example construction using a cushion and/or mattress application. The base of the section is a prime foam layer 3. On top of this is a 2 inch (5 cm) layer of flexible cellular foam with highly thermally-conductive solids 1 followed by a 2 inch (5 cm) layer 2 of standard, open-celled viscoelastic foam. The top layer is a second 2 inch (5 cm) layer of flexible cellular foam with highly thermally-conductive solids 1.

Figure 9:
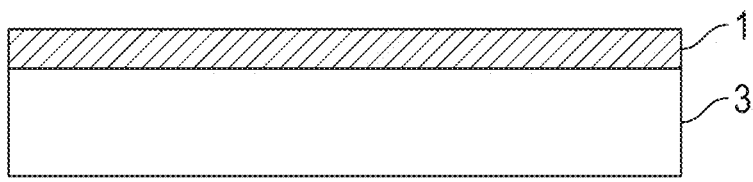
FIG. 9 is an example construction using a cushion and/or mattress application implementing the flexible cellular foams with highly thermally-conductive solids described herein.

FIG. 9 is an example construction using a cushion and/or mattress application. The base of the section is a prime foam layer 3. On top of this is a 3 inch layer of flexible cellular foam with highly thermally-conductive solids 1.

Figure 10:
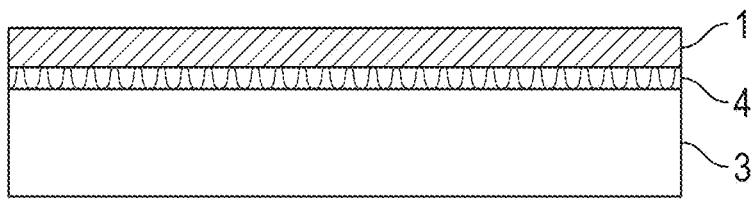
FIG. 10 is an example construction using a cushion and/or mattress application implementing the flexible cellular foams with highly thermally-conductive solids described herein.

FIG. 10 is an example construction using a cushion and/or mattress application. The base of the section is a prime foam layer 3. On top of this is a 3 inch (7.6 cm) layer of flexible cellular foam with highly thermally-conductive solids 1. The interface 4 between the two layers is a non-planar convolution, which may be made by convoluting the surface of either or both interfacing layers.

Figure 11:
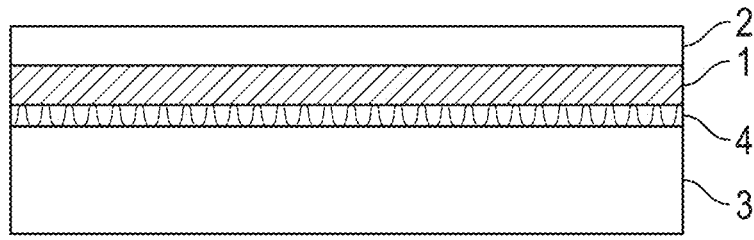
FIG. 11 is an example construction using a cushion and/or mattress application implementing the flexible cellular foams with highly thermally-conductive solids described herein.

FIG. 11 is an example construction using a cushion and/or mattress application. The base of the section is a prime foam layer 3. On top of this is a 2 inch (5 cm) layer of flexible cellular foam with highly thermally-conductive solids 1. The interface 4 between the two layers is a non-planar convolution, which may be made by convoluting the surface of either or both interfacing layers. The top of this example is a 2 inch (5 cm) layer 2 of standard, open-celled viscoelastic foam.

Figure 12:
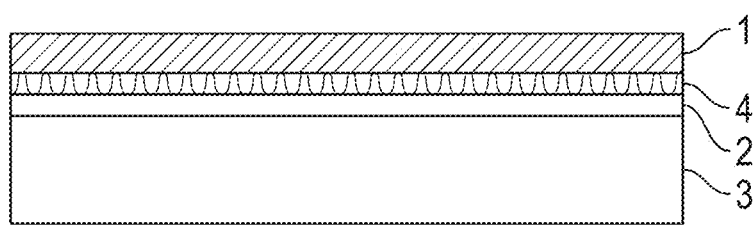
FIG. 12 is an example construction using a cushion and/or mattress application implementing the flexible cellular foams with highly thermally-conductive solids described herein.

FIG. 12 is an example construction using a cushion and/or mattress application. The base of the section is a prime foam layer 3. Above this is a 2 inch (5 cm) layer 2 of standard, open-celled viscoelastic foam. On top of this is a 2 inch layer (5 cm) of flexible cellular foam with highly thermally-conductive solids 1. The interface 4 between the two layers is a non-planar convolution, which may be made by convoluting the surface of either or both interfacing layers.

Figure 13:
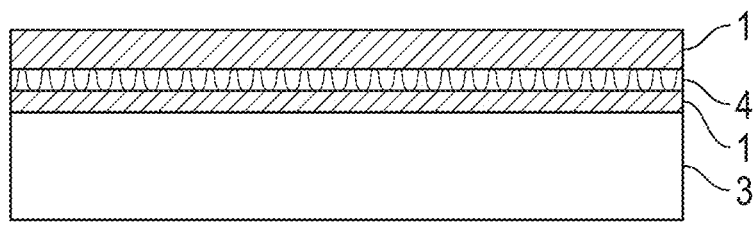
FIG. 13 is an example construction using a cushion and/or mattress application implementing the flexible cellular foams with highly thermally-conductive solids described herein.

FIG. 13 is an example construction using a cushion and/or mattress application. The base of the section is a prime foam layer 3. Above this is a 2 inch (5 cm) layer of flexible cellular foam with highly thermally-conductive solids 1. On top of this is another 2 inch (5 cm) layer of flexible cellular foam with highly thermally-conductive solids 1. The interface 4 between the two layers is a non-planar convolution, which may be made by convoluting the surface of either or both interfacing layers.

Figure 14:
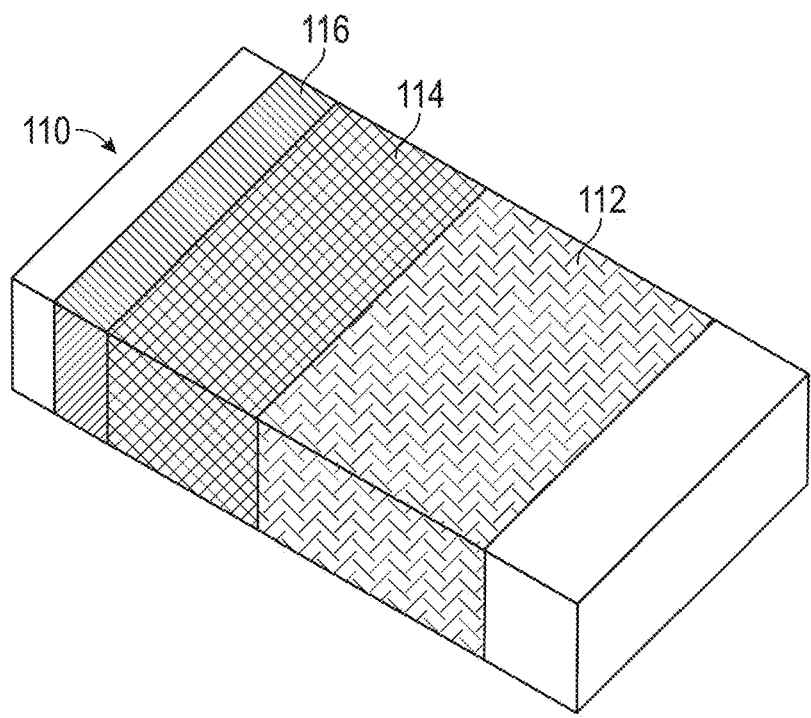
FIG. 14 shows an example breakdown of lateral mattress zones in a cushion and/or mattress application.

FIG. 14 is an example breakdown of lateral mattress zones or sections in a mattress 110. These zones include: lower body zone or section 112, torso/"belly band" zone or section 114, and head and shoulders zone or section 116. These zones or sections may or may not include flexible cellular foams with highly thermally-conductive solids, example constructions, other mattress layer constructions, or any variation thereof. Furthermore, the zones shown are not limiting, but used as an example to show the possibility of utilizing enhanced thermally dissipating layers in specific areas of cushions and/or a mattress.

Figure 15:
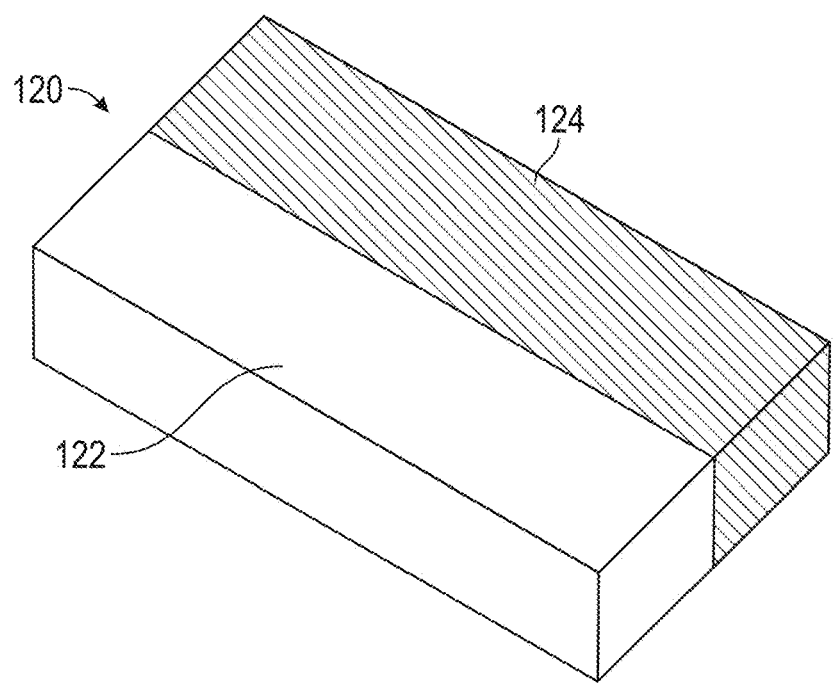
FIG. 15 shows an example breakdown of longitudinal mattress zones in a cushion and/or mattress application.

FIG. 15 is an example breakdown of longitudinal mattress zones 122 and 124 in a mattress 120. These zones include left section 122 and right section 124. These zones or sections 122 and 124 may or may not include flexible cellular foams with highly thermally-conductive solids, example constructions, other mattress layer constructions, or any variation thereof. Furthermore, the zones shown are not limiting, but used as an example to show the possibility of utilizing enhanced thermally dissipating layers in specific areas of cushions and/or a mattress.

Figure 16:
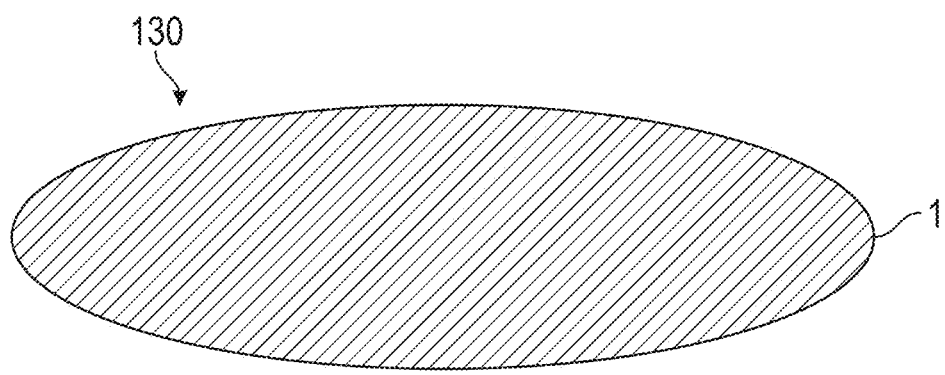
FIG. 16 is an example of a molded pillow product where the entire structure is molded from flexible cellular foam with highly thermally-conductive solids.
Figure 17:
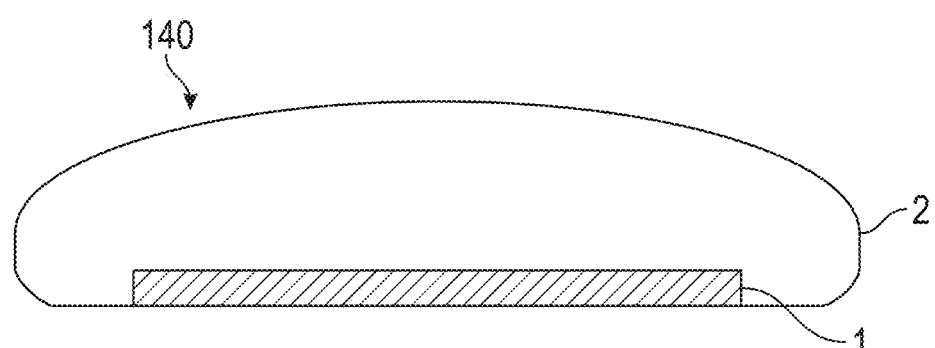
FIG. 17 is an example of a molded pillow product where the flexible cellular foams with highly thermally-conductive solids is a region or layer within the pillow.

FIGS. 16 and 17 are depictions of molded pillow systems. FIG. 16 is a pillow 130 molded entirely out of flexible cellular foam with highly thermally-conductive solids 1. FIG. 17 shows a pillow 140 using flexible cellular foam with highly thermally-conductive solids 1 as a region within the overall pillow structure 2.

There may also be provided a cellular foam comprising cross-linked latex foam and highly thermally-conductive solid (HTCS) particles dispersed in the cross-linked latex foam. The HTCS particles may be added in the range of about 0.1 to about 50% by weight of final net weight of cured latex foam. One process used for open-celled, flexible latex foam production involves adding the HTCS particles to the natural or synthetic latex liquid polymer, followed by introducing air into the latex, e.g. whipping or beating warm natural or synthetic latex in the presence of additives to promote open cell formation, stabilization and curing. Additives may include, but not necessarily be limited to, foam stabilizers, foam promoters, zinc oxide delayed action gelling agents, and combinations thereof. A final step in this process is to cure the foam with heat. Suitable latex foam production processes known by those skilled in the art for latex foam manufacturing include, but are not necessarily limited to, molded and free-rise latex methods produced with the Dunlop or Talalay latex processes. In the Talalay latex process, the latex foam is cured by introducing carbon dioxide into the mold with latex. The carbon dioxide reacts with water forming carbonic acid, which lowers the pH and causes the latex to thicken and hold its cell structure and shape. The mold temperature is then raised to about 230° F. and held for a determined amount of time to crosslink or vulcanize the latex polymer. In the Dunlop process, the latex mixture is cured by addition of chemical additives such as sodium fluorosilicate, and later the latex is vulcanized or cross-linked by raising the temperature.

There may also be provided a cellular foam comprising cross-linked melamine foam and highly thermally conductive solid (HTCS) particles dispersed in the cross-linked melamine foam. The HTCS particles may be added in the range of about 0.1 to about 50% by weight of final net weight of cured melamine foam.

While this detailed description has set forth particularly suitable embodiments of this invention, numerous modifications and variations of the structure of this invention, all within the scope of the invention, will readily occur to those skilled in the art. Accordingly, it is understood that this description is illustrative only of the principles of the invention and is not limitative thereof. Although specific features of the invention are shown in some of the drawings and not others, this is for convenience only, as each feature may be combined with any and all of the other features in accordance with this invention. Other embodiments will occur to those skilled in the art and are within the following claims.

The words "comprising" and "comprises" as used throughout the claims is interpreted "including but not limited to". The present invention may suitably comprise, consist or consist essentially of the elements disclosed and may be practiced in the absence of an element not disclosed.

In one non-limiting example, there may be provided a flexible cellular foam with highly thermally-conductive solids that consists essentially of or consists of a flexible cellular foam, and highly thermally-conductive solid particles dispersed in the flexible cellular foam, where the highly thermally-conductive solid particles are selected from a group of silicon carbide, synthetic diamond crystal powder, natural diamond crystal powder, type IIa diamond powder, synthetic diamond, boron nitride, carbonado, and combinations thereof.

What is claimed is:

1. A method for forming a flexible cellular polyurethane foam with highly thermally-conductive solids (HTCS Foam) comprising:
   introducing highly thermally-conductive solid particles into a mixture of flexible cellular foam-forming components comprising a polyol and an isocyanate, where the highly thermally-conductive solid particles are selected from a group consisting of synthetic diamond crystal powder, natural diamond crystal powder, type IIa diamond powder, synthetic diamond, carbonado, and combinations thereof, and where an average particle size of highly thermally-conductive solid particles ranges from about 50 nanometers to about 3000 microns; and
   polymerizing the polyol and the isocyanate in the presence of the highly thermally-conductive solid particles thereby forming the HTCS foam with highly thermally-conductive solid particles uniformly dispersed therein and bound to a foam matrix.

2. The method of claim 1 where the highly-thermally conductive solids ranges from about 0.1% to about 50% by weight based on the final foam net weight after gas loss.

3. The method of claim 1 where the one or more highly thermally-conductive solids ranges from about 1% to about 35% by weight based on the final foam net weight after gas loss.

4. The method of claim 1 where the one or more highly-thermally conductive solids ranges from about 5% to about 25% by weight based on the final foam net weight after gas loss.

5. The method of claim 1 wherein the HTCS Foam comprises a structure selected from the group consisting of a solid sheet, a perforated sheet, a non-planar sheet, a planar sheet, a textured sheet, and combinations thereof.

6. The method of claim 1 further comprising adhering the HTCS Foam to a layering substrate.

7. The method of claim 6 where the layering substrate is selected from the group consisting of flexible polyurethane foam, flexible polyester polyurethane foam, latex foam, flexible melamine foam, fibers in woven form, fibers in non-woven form, and combinations thereof.

8. The method of claim 1 where the HTCS foam has a thermal conductivity at 75% compression that is at least 0.008 W/(m-° K) higher than an identical flexible cellular polyurethane foam in the absence of the highly thermally-conductive solid particles.

9. A method for forming a flexible cellular polyurethane foam with highly thermally-conductive solids (HTCS Foam) comprising:

introducing from about from about 0.1% to about 50% by weight based on the final foam net weight highly thermally-conductive solid particles into a mixture of flexible cellular foam-forming components comprising a polyol and an isocyanate, where the highly thermally-conductive solid particles are selected from a group consisting of synthetic diamond crystal powder, natural diamond crystal powder, type IIa diamond powder, synthetic diamond, carbonado, and combinations thereof, and where an average particle size of highly thermally-conductive solid particles ranges from about 50 nanometers to about 3000 microns; and polymerizing the polyol and the isocyanate in the presence of the highly thermally-conductive solid particles thereby forming the HTCS foam with highly thermally-conductive solid particles uniformly dispersed therein and bound to a foam matrix, where the HTCS foam has a thermal conductivity at 75% compression that is at least 0.008 W/(m-° K) higher than an identical flexible cellular polyurethane foam in the absence of the highly thermally-conductive solid particles.

10. The method of claim 9 where the one or more highly thermally-conductive solids ranges from about 1% to about 35% by weight based on the final foam net weight after gas loss.

11. The method of claim 9 where the one or more highly-thermally conductive solids ranges from about 5% to about 25% by weight based on the final foam net weight after gas loss.

12. The method of claim 9 wherein the HTCS Foam comprises a structure selected from the group consisting of a solid sheet, a perforated sheet, a non-planar sheet, a planar sheet, a textured sheet, and combinations thereof.

13. The method of claim 9 further comprising adhering the HTCS Foam to a layering substrate.

14. The method of claim 13 where the layering substrate is selected from the group consisting of flexible polyurethane foam, flexible polyester polyurethane foam, latex foam, flexible melamine foam, fibers in woven form, fibers in non-woven form, and combinations thereof.

* * * * *